United States Patent [19]

Gulas et al.

[11] 4,073,656
[45] Feb. 14, 1978

[54] FIRED REFRACTORY BRICK AND PROCESS FOR PREPARING THE SAME

[75] Inventors: Hans-Jurgen Gulas; Helmut Neuper, both of Leoben, Austria

[73] Assignee: Veitscher Magnesitwerke-Actien-Gesellschaft, Vienna, Austria

[21] Appl. No.: 732,452

[22] Filed: Oct. 14, 1976

[30] Foreign Application Priority Data

Oct. 20, 1975 Austria ............................... 7955/75

[51] Int. Cl.$^2$ .............................................. C04B 35/48
[52] U.S. Cl. .......................................... 106/57; 106/62
[58] Field of Search .................................... 106/57, 62

[56] References Cited

U.S. PATENT DOCUMENTS 3,192,059  6/1965  Good et al. ............................ 106/57
4,010,039  3/1977  DeAza et al. .......................... 106/57

Primary Examiner—J. Poer
Attorney, Agent, or Firm—Kurt Kelman

[57] ABSTRACT

A fired refractory brick composed of magnesia, 2 to 10% alumina, calcium oxide and up to 1.5% silica, the weight ratio of calcium oxide to silica being more than 1.4, and at least 2.2(CaO -1.4 SiO$_2$)% zirconia, calcium and zirconium forming a calcium zirconate phase in the brick and the content of the calcium zirconate phase being from 0.5 to 8%, all percentages being by weight. This brick is prepared from a mixture of the components by pressing the mixture into the shape of a brick and firing the brick at a temperature of 1600° C to 1800° C until the brick contains the indicated amount of the calcium zirconate phase.

4 Claims, No Drawings

FIRED REFRACTORY BRICK AND PROCESS FOR PREPARING THE SAME

The present invention relates to a fired refractory brick composed primarily of magnesia and containing from 2 to 10%, by weight of alumina ($Al_2O_3$).

It is known that the resistance of refractory magnesia bricks to temperature changes is improved by an addition of alumina. The alumina may be added in various forms, such as calcined alumina, bauxite, aluminum powder which is oxidized at high temperatures, corundum or magnesium aluminum spinel. However, the addition of alumina has required the use of a magnesia raw material with a calcium oxide (CaO) to silica ($SiO_2$) weight ratio of less than 1.4 to obtain useful refractory bricks.

When a magnesia raw material with a $CaO/SiO_2$ weight ratio above 1.4 is used, a dicalcium silicate phase is produced, which tends to change from the beta- to the alpha-modification during firing or use of the brick in a refractory lining. This increases the volume by 10% and causes disintegration of the brick. This phenomenon is further enhanced by the presence of alumina so that it often is impossible to produce such bricks. It has been attempted to prrevent the disintegration by the addition of such agents as $B_2O_3$ or $P_2O_5$ but such additives have only limited effectiveness because of the effect of alumina in increasing the tendency towards disintegration. Furthermore, such additives inrease the melting phase component of the brick and thus reduce the refractory quality of the brick.

When the magnesia raw material contains CaO and $SiO_2$ in a weight ratio above 1.87, the excess calcium oxide reacts with the alumina in the brick to produce calcium aluminates which have a low melting point and, therefore, considerably reduce the refractory quality of the brick.

It is also impossible to reduce the $CaO/SiO_2$ weight ratio to below 1.4 by the addition of silica-containing substances because this increases the melting phase component, too, and correspondingly reduces the refractory quality of the brick.

Therefore, to obtain high-quality magnesia refractory bricks containing alumina, it was necessary to hold the $CaO/SiO_2$ weight ratio to below 1.4 and to hold the content of calcium oxide + silica as low as possible. It is difficult to fulfill these requirements with one and the same type of magnesia so that the raw material, such as magnesia ore or sinter magnesia, has usually had to be subjected to expensive purification processes.

The above and other disadvantages are obviated by adding zirconia to the mixture.

It is known to prepare fired refractory bricks from mixtures composed primarily of coarse refractory material, such as magnesia, having a grain size in excess of 0.15 mm, and fine material having a grain size below 0.15 mm in an amount of about 25 to 50%, by weight. The fine material component of the mixture is composed of from 12 to 40% $Al_2O_3$, from 3 to 15% $ZrO_2$, and from 85 to 45% MgO, all percentages being by weight, or a material yielding such percentages of alumina, zirconia and magnesia upon firing. The addition of zirconia is designed to prevent cracks during firing, which are due to a change in volume of the $MgO.Al_2O_3$ spinel at a temperature of about 1150° C.

However, experience has shown that this is not sufficient to produce bricks resistance to very high temperatures. To attain this object, the $CaO/SiO_2$ weight ratio and $SiO_2$ content in the brick, the minimum amount of $ZrO_2$ (zirconia) in dependence on the CaO and $SiO_2$ content, and the content of the calcium zirconate phase in the brick must all be carefully controlled.

The fired refractory brick according to this inventon is composed of magnesia, 2 to 10% alumina, calcium oxide and up to 1.5% silica, the weight ratio of calcium oxide to silica being more than 1.4, and at least 2.2(CaO - 1.4 $SiO_2$)% zirconia, calcium and zirconium forming a calcium zirconate phase in the brick and the content of the calcium zirconate phase being from 0.5 to 8%, all percentages being by weight. The preferred zirconia content in the brick is from 1 to 5%, by weight.

In accordance with the invention, such a brick is prepared from a mixture of magnesia, an alumina-containing substance, a zirconium compound yieldng at least 90%, by weight, of zirconia upon firing, the mixture contaning calcium oxide and up to 1.5% silica, the weight ratio of calcium oxide to silica being more than 1.4, and 2.2(CaO-1.4 $SiO_2$) to 5.5% zirconia, calculated on an ignition loss free basis, all percentages being by weight, and a temperary bonding agent. The mixture is pressed into the shape of a brick and fired at a temperature of 1600° C to 1800° C until the brick contains 0.5 to 8%, by weight, of a calcium zirconate phase.

Preferably, the zirconium compound is finely divided in a grain size up to 0.1 mm to facilitate the complete reaction of the excess CaO with $ZrO_2$ to obtain the calcium zirconate phase.

The calciun zirconate phase obtained in the brick during firing is of very high refractoriness (melting point about 2300°C). In view of the low silica content, the content of the low-melting merwinite phase is also low, the low-melting phase of the brick being limited to the merwinnite present. Since no $2CaO.SiO_2$ is present, there can be no disintegration due to this dicalcium silicate component. Nor are there calcium aluminates present in the brick.

It may be useful to use a slight excess amount of zirconia above the stoichiometric amount. It does not interferc with the reaction and remains unchanged as a zirconia phase in the brick. With this in mind, 1 to 5%, by weight, zirconia is normally used.

The zirconium compound used in preparing the mixture may be zirconium dioxide, preferably in unstabilized form, pure or containing no more than 10%, by weight, of impurities but little, if any, silica, or such practically silicate-free compounds as zirconium carbonate, zirconiun ammonium carbonate, zirconium sodium carbonate, zirconium hydroxide, zirconium sulfate, zirconium nitrate, and the like. Zirconium silicate ($ZrO_2.SiO_2$) cannot be used for the preparation of refractory bricks according to this invention. A useful zirconium compound is, for example, baddeleyite ore which may have the following composition:

| | | |
|---|---|---|
| Ignition loss | | 0.45%, by weight |
| $SiO_2$ | | 0.32%, by weight |
| $Al_2O_3$ | about | 0.1%, by weight |
| $Fe_2O_3$ | | 0.56%, by weight |
| CaO | | 0.41%, by weight |
| MgO | | traces |
| MnO | about | 1.0%, by weight |
| $TiO_2$ | | 0.57%, by weight |
| $ZrO_2$ | | 96.6%, by weight |

The zirconia component indicated in the above analysis contains a small amount (for instance about 0.02%, by weight) of hafnium dioxide ($HfO_2$).

The magnesia raw material used in preparing the mixture may be a burnt magnesia obtained from natural magnesite ore or seawater, as well as synthetic magnesia. Fused magnesia grain could also be used. The invention is of advantage with iron-poor as well as iron-rich magnesia.

The following examples and comparative tests will further illustrate the practice and advantages of the present invention.

EXAMPLE 1

A mixture of the following composition and grain size distribution was prepared from an iron-poor burnt magnesia with a $CaO/SiO_2$ weight ratio exceeding 1.87, calcined alumina and finely divided baddeleyite:

20%, by weight, of burnt magnesia of 3-5 mm grain size
40%, by weight, of burnt magnesia of 1-3 mm grain size
15%, by weight, of burnt magnesia of 0.1-2 mm grain size
18%, by weight, of burnt magnesia up to 0.1 mm grain size
5%, by weight, of calcined alumina up to 0.2 mm grain size
2%, by weight, of baddeleyite alumina up to 0.1 mm grain size The components were mixed in the usual manner, with the addition of a temporary bonding agent consisting of 4%, by weight, of a magnesium sulfate solution of 26° Be and 5%, by weight, of water, and the mixture was pressed into the shape of bricks under a pressure of about 1100 kp/cm². The pressed bricks were dried and then fired at a temperature of 1780° C for 4 hours (excluding the times for heating up to the firing temperature and cooling). The chemical analysis of the bricks and the test values are shown in Table I.

EXAMPLE 2

The same procedure was followed as in Example 1, except that the calcined alumina component was replaced by fused corundum having a grain size of 0.5 to 1 mm. Analysis and test values are shown in Table I.

EXAMPLE 3

For purposes of comparison, the same procedure was followed as in Example 2, except that the baddeleyite component was omitted and replaced by an additional 2%, by weight, of burnt magnesia having a grain size up to 0.1 mm. The analysis is given in Table I.

In this experiment, most of the bricks disintegrated after they were removed from the firing (tunnel) kiln. A phase analysis showed that this disintegration was due to the presence of dicalcium silicate. It was not possible to obtain any technological test data from the disintegrated residues.

EXAMPLE 4

For purposes of comparison, bricks were produced in the same manner as in Example 3 from iron-poor burnt magnesia with a $CaO/SiO_2$ weight ratio below 1.4 and fused corundum, except that a firing temperature of 1650° C had to be used in view of the higher percentage of a melting phase in the mixture. Analysis and test values are shown in Table I.

EXAMPLE 5

For purposes of comparison, bricks were produced in accordance with Example 4, except that 2%, by weight, of baddeleyite and the grain distribution of Example 2 was used. The bricks were fired at a temperature of 1650° C. Analysis and test values are shown in Table I.

In the Tables, C/S means the weight ratio of $CaO/SiO_2$.

Table I

| Example | 1 | 2 | 3 | 4 | 5 |
|---|---|---|---|---|---|
| Analysis (%, by weight): | | | | | |
| $SiO_2$ | 0.72 | 0.71 | 0.72 | 3.86 | 3.76 |
| $Fe_2O_3$ | 0.33 | 0.31 | 0.31 | 0.22 | 0.22 |
| $Al_2O_3$ | 5.00 | 5.01 | 5.01 | 5.05 | 5.05 |
| CaO | 1.75 | 1.75 | 1.78 | 1.50 | 1.47 |
| MgO (by difference) | 90.27 | 90.30 | 92.18 | 89.37 | 87.57 |
| $ZrO_2$ | 1.93 | 1.93 | — | — | 1.93 |
| C/S | 2.45 | 2.46 | 2.47 | 0.39 | 0.39 |
| Firing temperature ° C | 1780 | 1780 | 1780 | 1650 | 1650 |
| Crushing strength at room temperature kg/cm² | 730 | 691 | * | 704 | 692 |
| at 1400° C kg/cm² | 165 | 185 | * | 32 | 34 |
| at 1500° C kg/cm² | 52 | 69 | * | — | — |
| Porosity (open) vol.% | 18.4 | 17.3 | * | 15.2 | 15.6 |
| Resistance to temperature changes/ quenchings until breakage | >100; >100 | >100; >100 | * | >100; >100 | >100; >100 |

* bricks disintegrated after firing

As can be seen from Table I, the brick mixtures according to Examples 1 and 2 may be subjected to higher firing temperatures and attain higher resistance to high temperatures than conventional mixtures with alumina (comparative Example 4). In these conventional mixtures (Example 5), the addition of zirconia has no effect.

EXAMPLE 6

Following the procedure of Example 1, bricks were produced from an iron-rich burnt magnesia having a $CaO/SiO_2$ weight ratio above 1.87, except that 3%, by weight, of the baddeleyite component was used while the burnt magnesia component of a grain size up to 0.1 mm was reduced to 17%, by weight. the firing temperature was 1650° C. Analysis and test values are shown in Table II.

EXAMPLE 7

Example 6 was repeated but the calcined alumina component was replaced by fused corundum having a grain size of 0.5 to 1 mm. Analysis and test values are shown in Table II.

EXAMPLE 8

For purposes of comparison, the procedure of Example 6 was repeated with an iron-rich burnt magnesia having a $CaO/SiO_2$ weight ratio below 1.4, the baddeleyite component was replaced by an additional 3%, by weight, of the burnt magnesia component of a grain size up to 0.1 mm, and the firing temperature was reduced to 1550° C, due to the higher amount of a meltng phase in the mixture. As Table II shows, the bricks of Examples 6 and 7 have a higher resistance to high temperatures.

The resistance to temperature changes (thermal shock resistance) was determined by the air quenching test method, in which for each example two test pieces having a size of 250 × 125 × 65 mm are heated in a muffle furnace to a temperature of 950° C for 55 minutes. Then the test pieces are taken out of the furnace, are quenched by compressed air for 5 minutes, and are again heated in the muffle. These cycles of heating and quenching are repeated until breakage of the test pieces occurs. The number of quenching cycles until breakage is noted as a measure of the thermal shock resistance. If after 100 quenching cycles no breakage occurs the test is ended and ">100" is noted as the measure.

Table II

| Example | 6 | 7 | 8 |
|---|---|---|---|
| Analysis (%, by weight): | | | |
| $SiO_2$ | 0.47 | 0.47 | 3.74 |
| $Fe_2O_3$ | 5.54 | 5.52 | 1.70 |
| $Al_2O_3$ | 5.37 | 5.38 | 6.18 |
| CaO | 1.75 | 1.75 | 1.78 |
| MgO (by difference) | 83.97 | 83.98 | 86.60 |
| $ZrO_2$ | 2.90 | 2.90 | — |
| C/S | 3.72 | 3.72 | 0.48 |
| Firing temperature ° C | 1650 | 1650 | 1550 |
| Crushing strength at room temperature kg/cm$^2$ | 822 | 756 | 702 |
| at 1400° C kg/cm$^2$ | 144 | 132 | 90 |
| at 1500° C kg/cm$^2$ | 46 | 24 | — |
| Porosity (open) vol. % | 17.4 | 16.9 | 17.7 |
| Resistance to temperature changes/quenchings until breakage | 79;>100 | 94;>100 | 59;>100 |

What is claimed is:

1. A fired refractory brick composed of magnesia, 2 to 10% alumina, calcium oxide and up to 1.5% silica, the weight ratio of calcium oxide to silica being more than 1.4 and 2.2 (CaO - 1.4 $SiO_2$)% to 5.5% zirconia, calculated on an ignition loss free basis, calcium oxide and zirconia forming a calcium zirconate phase in the brick and the content of the calcium zirconate phase being from 0.5 to 8%, all percentages being by weight.

2. The fired refractory brick of claim 1, wherein the zirconia content is from 1 to 5%, by weight.

3. A process for preparing a fired refractory brick, comprising the steps of
   (a) preparing a mixture of magnesia, an alumina-containing substance, a zirconium compound yielding at least 90%, by weight, zirconia upon firing, the mixture containing calcium oxide and up to 1.5% silica, the weight ratio of calcium oxide to silica being more than 1.4, and 2.2(CaO - 1.4 $SiO_2$) to 5.5% zirconia, calculated on an ignition loss free basis, all percentages being by weight, and a temporary bonding agent,
   (b) pressing the mixture into the shape of a brick, and
   (c) firing the brick at a temperature of 1600° C to 1800° C until the brick contains 0.5 to 8%, by weight, of a calcium zirconate phase.

4. The process of claim 3, wherein the zirconium compound is finely divided in a grain size up to 0.1 mm.

* * * * *